US 12,448,073 B2

(12) United States Patent
Jeong et al.

(10) Patent No.: US 12,448,073 B2
(45) Date of Patent: Oct. 21, 2025

(54) PERSONAL MOBILITY DEVICE WITH A GUARD

(71) Applicants: HYUNDAI MOTOR COMPANY, Seoul (KR); KIA CORPORATION, Seoul (KR); KOOKMIN UNIVERSITY INDUSTRY ACADEMY COOPERATION FOUNDATION, Seoul (KR)

(72) Inventors: Gu Min Jeong, Seoul (KR); Hyun Jung Oh, Seoul (KR); Seung Hyeon Lee, Seoul (KR); Yo Cheol Jang, Suwon-si (KR); Choong Yub Lee, Seoul (KR); Jongmyung Park, Seoul (KR); Dong Hee Seok, Seoul (KR); Jae Jun Ha, Hwaseong-si (KR)

(73) Assignees: HYUNDAI MOTOR COMPANY, Seoul (KR); KIA CORPORATION, Seoul (KR); KOOKMIN UNIVERISTY INDUSTRY ACADEMY COOPERATION FOUNDATION, Seoul (KR)

( * ) Notice: Subject to any disclaimer, the term of this patent is extended or adjusted under 35 U.S.C. 154(b) by 950 days.

(21) Appl. No.: 17/526,807

(22) Filed: Nov. 15, 2021

(65) Prior Publication Data
US 2022/0411001 A1    Dec. 29, 2022

(30) Foreign Application Priority Data
Jun. 24, 2021    (KR) .................. 10-2021-0082463

(51) Int. Cl.
*B62J 23/00*    (2006.01)

(52) U.S. Cl.
CPC .................................... *B62J 23/00* (2013.01)

(58) Field of Classification Search
CPC ....................................................... B62J 23/00
See application file for complete search history.

(56) References Cited

U.S. PATENT DOCUMENTS 6,279,930 B1 *    8/2001    Chang .................... B62K 3/002
                                                       280/87.043
6,435,529 B1 *    8/2002    Stewart .................. B62K 3/002
                                                       188/19

(Continued)

FOREIGN PATENT DOCUMENTS

CN         1284455 A       2/2001
CN         107624095 A     1/2018
(Continued)

OTHER PUBLICATIONS

Office Action cited in Chinese patent application No. 202111439836.8; Apr. 11, 2025; 15 pp.

*Primary Examiner* — Minnah L Seoh
*Assistant Examiner* — Michael R Stabley
(74) *Attorney, Agent, or Firm* — Lempia Summerfield Katz LLC

(57) ABSTRACT

A personal mobility device (PMD) has a footboard unit including a footboard, a front wheel disposed on the footboard, and a rear wheel disposed behind the front wheel on the footboard. The PMD also has a steering unit including a steering axle, a fixation unit that connects one end of the steering axle to the footboard unit, and a grip disposed on the other end of the steering axle. The PMD also has a side guard disposed on each side of the footboard unit and extending along an axial direction of the footboard.

8 Claims, 13 Drawing Sheets

(56) References Cited

U.S. PATENT DOCUMENTS

| | | | |
|---|---|---|---|
| 8,740,230 B2* | 6/2014 | Grossman | B62J 6/015 |
| | | | 280/87.041 |
| 9,290,143 B2* | 3/2016 | Arjona | A63C 17/012 |
| 10,399,623 B2 | 9/2019 | Yeo | |
| 10,494,044 B2* | 12/2019 | Privitelli | B62H 1/04 |
| 10,583,881 B2 | 3/2020 | Yeo | |
| D902,789 S * | 11/2020 | Taylor | D12/120 |
| 10,913,503 B2 | 2/2021 | Yeo | |
| 10,960,953 B2* | 3/2021 | Liu | B62K 25/04 |
| 11,383,777 B2* | 7/2022 | Khanna | B62H 1/02 |
| 12,071,190 B2* | 8/2024 | Huang | B62H 5/06 |
| 2002/0167147 A1* | 11/2002 | Muehlhauser | B62J 50/15 |
| | | | 280/87.041 |
| 2004/0251657 A1 | 12/2004 | Kan et al. | |
| 2018/0154965 A1 | 6/2018 | Yeo | |
| 2018/0154966 A1 | 6/2018 | Yeo | |
| 2018/0162471 A1 | 6/2018 | Yeo | |
| 2019/0248439 A1* | 8/2019 | Wang | B62K 11/10 |
| 2020/0102032 A1* | 4/2020 | Huang | B62H 5/20 |
| 2021/0107578 A1* | 4/2021 | Khanna | B62H 1/06 |
| 2021/0165404 A1* | 6/2021 | Gillett | G01C 21/3691 |

FOREIGN PATENT DOCUMENTS

| | | |
|---|---|---|
| CN | 207523555 U | 6/2018 |
| CN | 209719794 U | 12/2019 |
| FR | 2835224 A1 | 8/2003 |
| KR | 102194769 B1 | 12/2020 |

\* cited by examiner

PERSONAL MOBILITY DEVICE WITH A GUARD

CROSS-REFERENCE TO RELATED APPLICATION

This application is based on, and claims priority to, Korean Patent Application Number 10-2021-0082463 filed on Jun. 24, 2021, the disclosures of which are incorporated by reference herein in their entirety.

TECHNICAL FIELD

Embodiments of the present disclosure relate to a personal mobility device (PMD) equipped with a guard or guards that mitigate impact when a PMD falls or collides with an external object.

BACKGROUND

The content described in this section merely provides background information for the present disclosure and does not constitute prior art.

In recent years, the importance of cars as transportation is decreasing, and the importance of personal mobility devices (PMDs) is increasing. Here, the PMD is a transportation device such as, for example, an electric kickboard, a bike, and the like.

The mobility of the PMD is superior to that of vehicles on roads that are not built for cars. For example, on narrow roads, it is difficult for cars to travel at a high speed or make sharp turns. Meanwhile, since the PMD is smaller in size, it is easier for PMDs to travel at a higher speed or make sharp turns on narrow roads.

However, the PMD lacks protection for passengers compared to cars. For example, a vehicle may use a chassis, an air bag, or the like to mitigate the impact on passengers in the case of a collision with an external object. Meanwhile, the PMD lacks protection for passengers, and passengers could be seriously injured. In addition, studies on car technologies that prevent collisions with pedestrians or reduce impact on pedestrians have been active, but the same studies for PMD collisions have not been as active.

In addition, PMDs have the disadvantage of being more vulnerable to impact or collision compared to vehicles. The PMD is simple in structure and can easily break or fail even with a simple impact.

SUMMARY

A personal mobility device (PMD) is disclosed and in one example includes: a footboard unit including a footboard, a front wheel disposed on the footboard, and a rear wheel disposed behind the front wheel on the footboard; a steering unit including a steering axle, a fixation unit that connects one end of the steering axle to the footboard unit, and a grip disposed on the other end of the steering axle; and a side guard disposed on both sides of the footboard unit and extended along an axial direction of the footboard.

A PMD in another example includes: a frame unit including a body frame, a front wheel disposed in front of the body frame, and a rear wheel disposed behind the front wheel in the body frame; a steering unit including a steering axle, a fixation unit that connects the steering axle and the frame unit, and a grip disposed on one end of the steering axle; and a side guard disposed on both sides of the body frame and extended along an axial direction of the body frame.

DETAILED DESCRIPTION

Figure 1A:
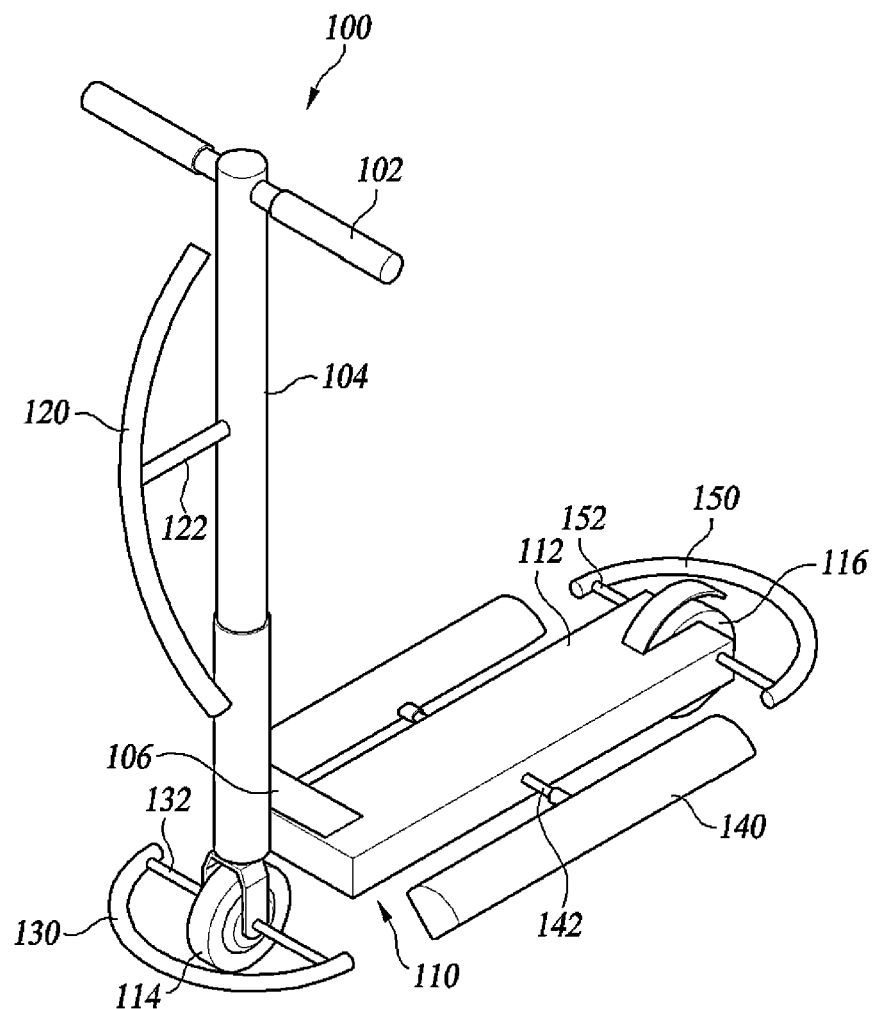
FIGS. 1A and 1B are perspective views of a personal mobility device (PMD) equipped with guards in accordance with an embodiment of the present disclosure.

Hereinafter, some embodiments of the present disclosure are described with reference to the drawings. It should be noted that in giving reference numerals to components of the accompanying drawings, the same or equivalent components are denoted by the same reference numerals even when the components are illustrated in different drawings. In describing the present disclosure, when a detailed description of related known functions or configurations may obscure the subject matter of the present disclosure, the detailed description thereof has been omitted.

In addition, in describing the components of the present disclosure, terms such as first, second, A, B, (a), (b), etc. may be used. These terms are used only in order to distinguish any component from other like or similar components. Features, sequences, or the like, of corresponding components are not limited by these terms. Throughout the present specification, unless explicitly described to the contrary, an example described as "including" and "comprising" components should be understood to imply the inclusion of other elements rather than the exclusion of any other elements. A term, such as "part," "module," or the like described in the specification, means a unit of processing at least one function or operation and may be implemented as hardware or software or a combination of hardware and software and may include at least one processor. When a component, device, element, or the like of the present disclosure is described as having a purpose or performing an operation, function, or the like, the component, device, or element should be considered herein as being "configured to" meet that purpose or to perform that operation or function.

In the following description, a personal mobility device (hereinafter, 'PMD') is a transportation device. For example, the types of PMDs include personal mobility vehicles (PM vehicles), micro mobility vehicles, electric bicycles, electric kickboards, electric scooters, electric wheelchairs, electric bikes, 2-wheel drive devices, smart cars, shuttles, personal movement means, personal flight means, smart mobility devices, shared mobility devices, First Mile and Last Mile vehicles, PBVs (Purpose Built Vehicles), PAVs (Personal Air Vehicles), cars, electric cars, motor vehicles, passenger automobiles, alternative fuel vehicles, and the like.

In the following description, the PMD with a guard is described in the form of a kickboard, but the PMD with a guard may also be implemented in other forms.

FIG. 1A is a perspective view of a PMD with guards in accordance with an embodiment of the present disclosure.

FIG. 1A shows the PMD having a steering unit 100, a grip 102, a steering axle 104, a fixation unit 106, a footboard unit 110, a footboard 112, a front wheel 114, a rear wheel 116, an axle guard 120, an axle guard connection unit 122, a front guard 130, a front guard connection unit 132, a side guard 140 on each side of the footboard 112, respective side guard connection units 142, a rear guard 150, and a rear guard connection unit 152.

In accordance with an embodiment of the present disclosure, a PMD with guards may include the steering unit 100, the footboard unit 110, the axle guard 120, and the side guards 140. In accordance with another embodiment of the present disclosure, a PMD with guards may include the steering unit 100, the footboard unit 110, and the side guard 140. The PMD may include any one or more of the noted guards.

The steering unit 100 includes a grip 102, a steering axle 104, and a fixation unit 106. Here, the fixation unit 106 connects one end of the steering axle 104 and the footboard unit 110. The grip 102 is disposed on the other end of the steering axle 104. The passenger can control the steering of the PMD with the steering unit.

The footboard unit 110 includes a footboard 112, a front wheel 114, and a rear wheel 116. The front wheel 114 is disposed on the footboard 112. The rear wheel 116 is disposed behind the front wheel 114 on the footboard 112. The footboard unit 110 may further include a foot brake.

The footboard 112 is where a passenger places his or her foot. One of the front wheel 114 and the rear wheel 116 may be a steering wheel. When the PMD is an electric kickboard, at least one of the front wheel 114 and the rear wheel 116 may be a driving wheel.

The axle guard 120 is disposed in front of the steering axle 104 and extends along the axial direction of the steering axle 104.

The side guard 140 is disposed on both sides of the footboard unit 110 and extends along the axial direction of the footboard 112.

The PMD in accordance with an embodiment of the present disclosure may further include more parts, such as a front guard 130, a front guard connection unit 132, a rear guard 150, and a rear guard connection unit 152.

The front guard 130 is disposed adjacent to the front wheel 114 and is configured to protect the front wheel 114. The front guard 130 may be connected to the front wheel 114 or the footboard 112 via the front guard connection unit 132.

The rear guard 150 is disposed adjacent to the rear wheel 116 and is configured to protect the rear wheel 116. The rear guard 150 may be connected to the rear wheel 116 or the footboard 112 via a rear guard connection unit 152.

In accordance with an embodiment of the present disclosure, the axle guard 120, front guard 130, side guard 140, and rear guard 150 may be implemented as a single or composite material for impact absorption. For example, each guard may be implemented with an elastic rubber or with a plastic frame inside and a sponge material outside. When each guard is made of a material that absorbs impact, the passenger can be protected even if the guards collides with an external object. Also, the impact on a pedestrian can be mitigated when the guards collide with a pedestrian.

In accordance with an embodiment of the present disclosure, the cross section of the side guard 140 may be a fan shape. Specifically, a cross section obtained by cutting the side guard 140 in a direction perpendicular to the axial direction of the footboard 112 may have a fan shape including a curved region that faces upwards. In other words, the center of the fan shape can face the ground. In addition, the cross section of the side guard 140 in accordance with another embodiment of the present disclosure may be implemented in any form that can widen (e.g., increase) the area in contact with the ground when the PMD is tilted sideways.

In accordance with the cross sectional shape of the side guard 140, when the PMD is tilted, the contact area between the side guard 140 and the ground is widened or increased. Therefore, the impact on the PMD can be mitigated. Further, in accordance with the cross sectional shape of the side guard 140, the PMD can maximize the angle at which the PMD is tilted while traveling, and thus improve driving performance.

The PMD in accordance with an embodiment of the present disclosure may further include a side guard connection unit 142 that connects the footboard 112 and each of the side guards 140.

Each side guard connection unit 142 in accordance with an embodiment of the present disclosure is configured to be rotatable relative to the footboard 112 about a first rotation axis that is parallel to the axial direction of the footstep 112. Here, the first rotation axis is a virtual rotation axis and may be located inside the footboard 112. By rotation of the side guard connection unit 142, the side guard 140 can be used as a kick stand, support fixture, or rest fixture of a PMD. This maximizes the utilization of the PMD.

Each side guard connection unit 142 in accordance with an embodiment of the present disclosure may be provided with a cushioning member or a structure for cushioning. Here, the cushioning member may include one or more of a coil spring, a flat spring, a mini block spring, rubber material, sponge material, an elastic member, a damper, or the like. The damper may be implemented as a hydraulic system, a solid friction system, or a fluid friction system. The side guard connection unit 142 may be made of a softer material than the side guard 140 or the footboard 112. In addition, the cushioning member provided within the side guard connection unit 142 can be implemented using a variety of materials or structures that can absorb impact. Through the cushioning member or structure of the side guard connection unit 142, the PMD can be protected from external impact.

The side guard connection unit 142 in accordance with one embodiment of the present disclosure includes a plurality of apertures for impact absorption. Due to the plurality of apertures, each side guard connection unit 142 can easily be crushed when impact is applied to the side guard 140. Otherwise, due to the plurality of apertures, the side guard connection units 142 may be resilient in various directions. The side guard connection units 142 may mitigate impact on the footboard 112 through buckling or elasticity. Further, the side guard connection units 142 may be made of a softer material than that of side guard 140 or footboard 112.

The axle guard 120 in accordance with one embodiment of the present disclosure is configured to be rotatable about a second rotation axis through the axle guard 120 and the steering axle 104. The axle guard 120 is disposed parallel to the steering axle 104 to protect the PMD and the passenger from external impact. When the axle guard 120 is disposed perpendicular to the steering axle 104, the grip 102 and the steering axle 104 can be protected even when the PMD falls sideways. The length of the axle guard 120 is long enough to protect the grip 102 even when the PMD is tilted.

Figure 1B:
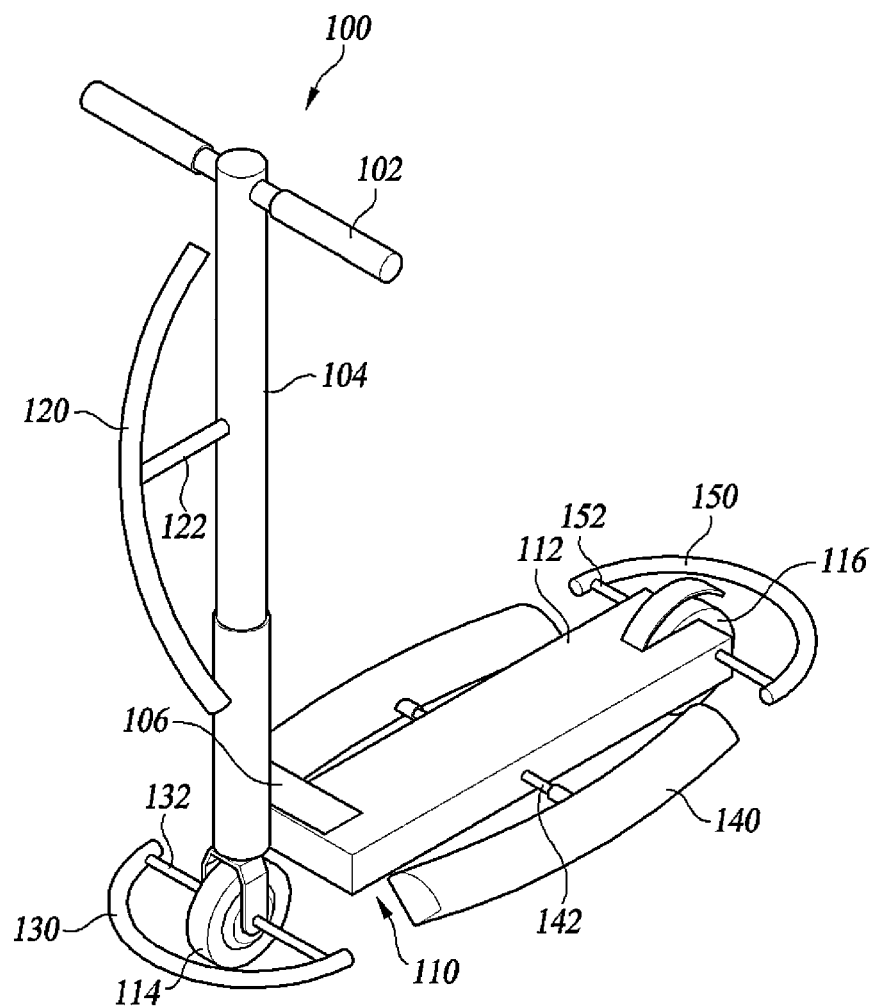

FIG. 1B is a perspective view of a PMD with guards in accordance with an embodiment of the present disclosure.

Referring to FIG. 1B, the side guards 140 in accordance with an embodiment of the present disclosure may be a curved shape along the axial direction of the footboard 112.

Specifically, the center portion of each side guard 140 is configured to face the opposite direction of the footboard 112. Both sides of the side guard 140 along the axial direction of the footboard 112 are configured to face the footboard 112.

The curved side guards 140 primarily mitigate impact and the side guard connection units 142 secondarily mitigates impact.

By forming the side guards 140 in a curved shape, it is possible to efficiently mitigate various impacts.

Figure 2A:
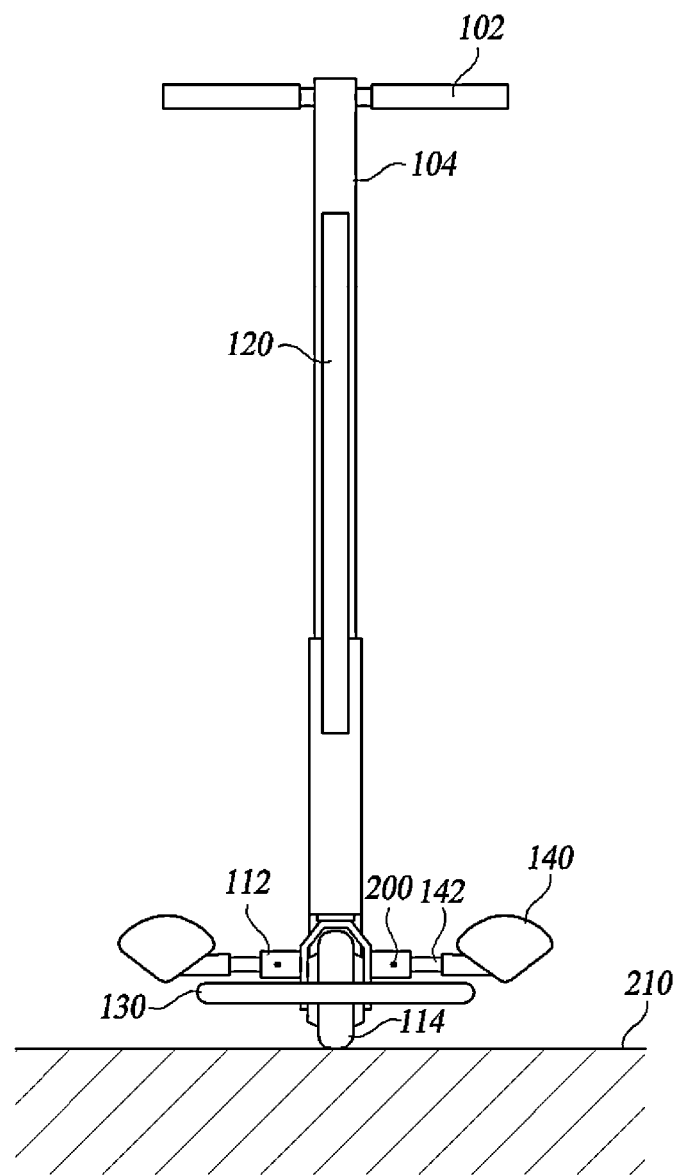
FIGS. 2A, 2B, and 2C are front views of a PMD equipped with guards in accordance with an embodiment of the present disclosure.
Figure 2B:
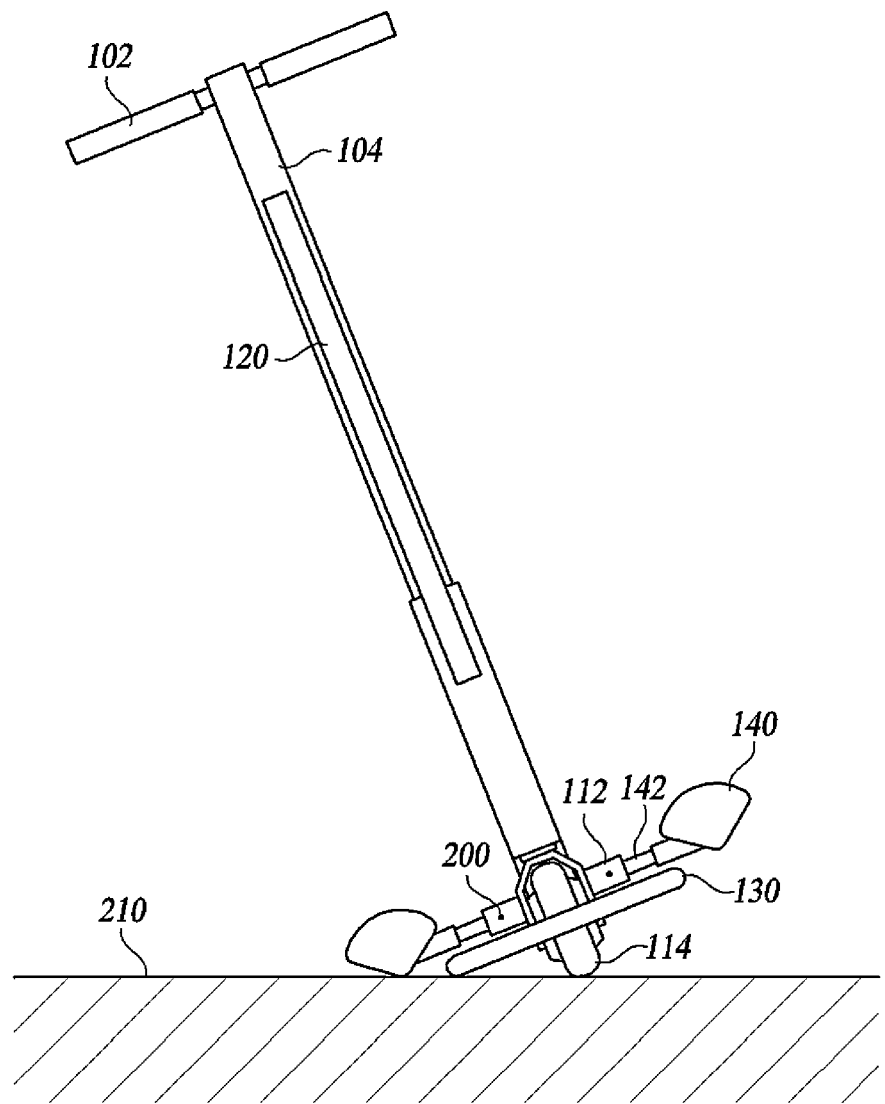
Figure 2C:
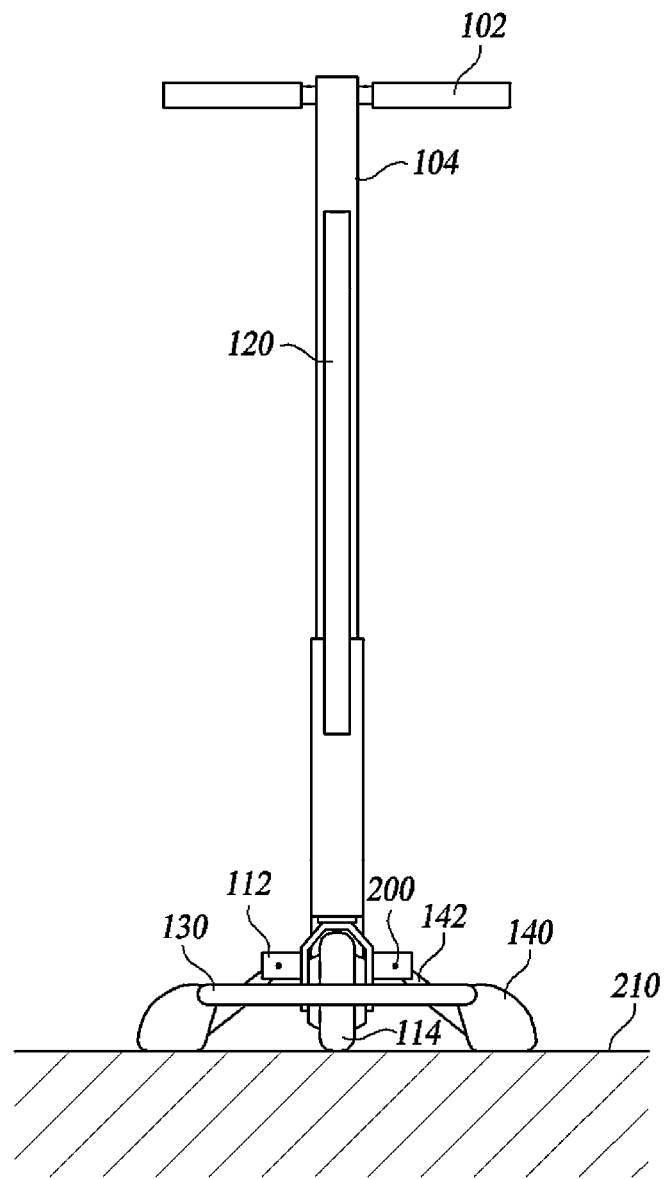

FIGS. 2A, 2B, and 2C are front views of a PMD equipped with guards in accordance with an embodiment of the present disclosure.

FIGS. 2A, 2B, and 2C show the PMD including the grip 102, the steering axle 104, the footboard 112, the front wheel 114, the axle guard 120, the front guard 130, the side guards 140, the side guard connection units 142, a first rotation axis 200, and the ground 210.

Referring to FIGS. 2A and 2B, in the absence of the side guards 140, a large impact may be applied to the grip 102 when the PMD falls. Meanwhile, when the side guards 140 are provided, even if the PMD is tilted or turned sideways, the contact area between the side guard 140 and the ground 210 is wide, so the impact on the PMD is mitigated.

Referring to FIG. 2C, one of the side guards 140 and side guard connection units 142 may be used as a kick stand, support fixture, or rest fixture of the PMD.

The side guard connection unit 142 may be configured to be rotatable relative to the footboard 112 about the first rotation axis 200 parallel to the axial direction of the footboard 112. Through rotation of the side guard connection unit 142, the side guard 140 can be spaced apart from the ground 210 during travel and serve as a guard. Through the rotation of the side guard connection unit 142, the side guard 140 can act as a kickstand against the ground 210 when the PMD is stopped. With these functions, the PMD can have improved safety, utilization, and driving performance.

Figure 3A:
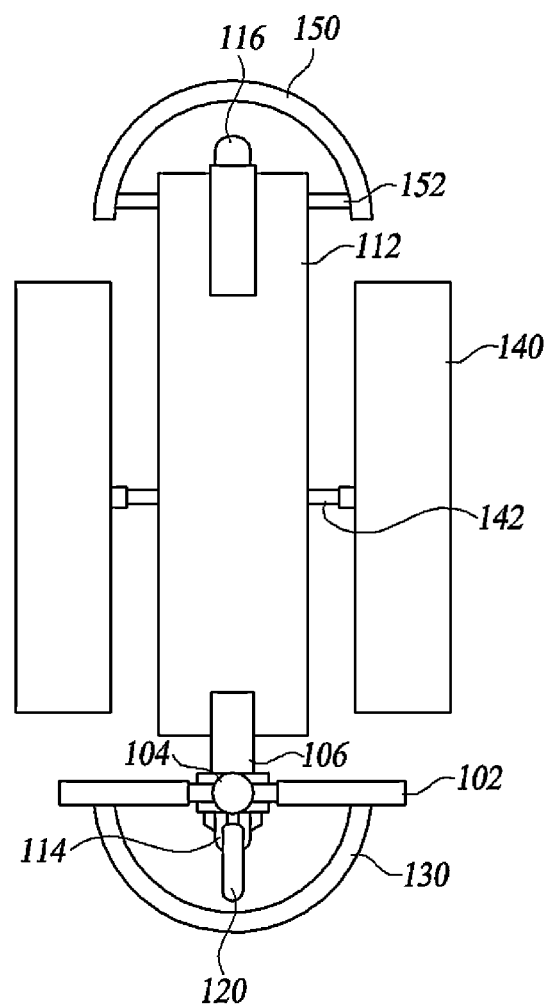
FIGS. 3A, 3B, and 3C are top views of a PMD equipped with guards in accordance with an embodiment of the present disclosure.
Figure 3B:
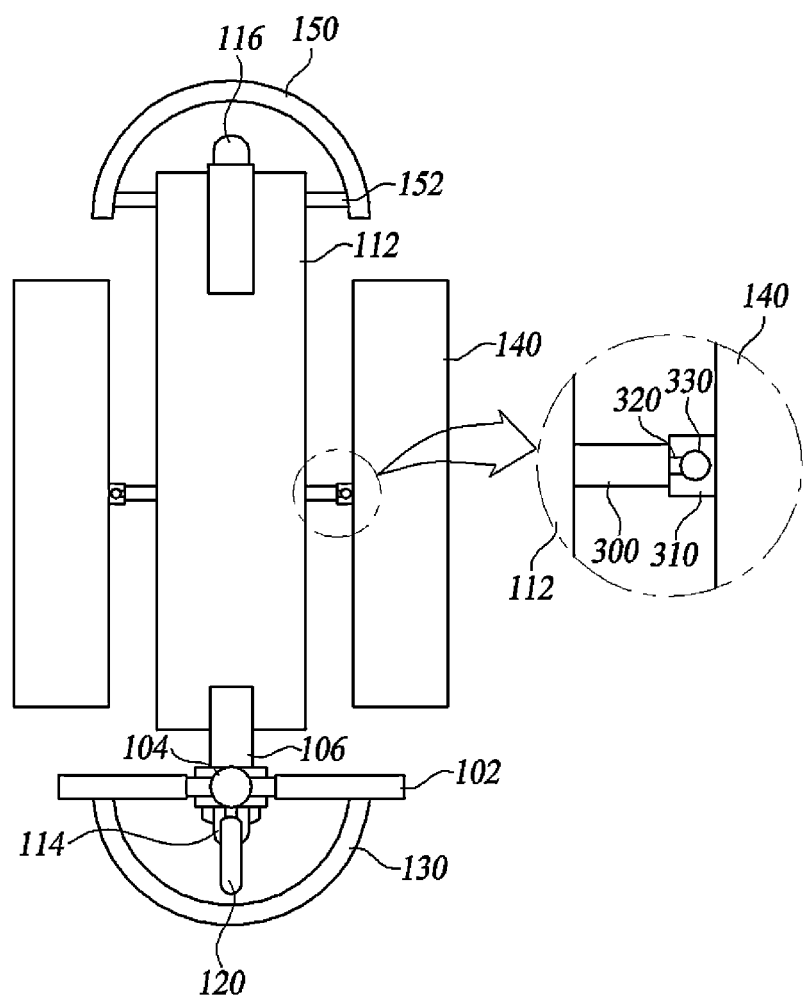
Figure 3C:
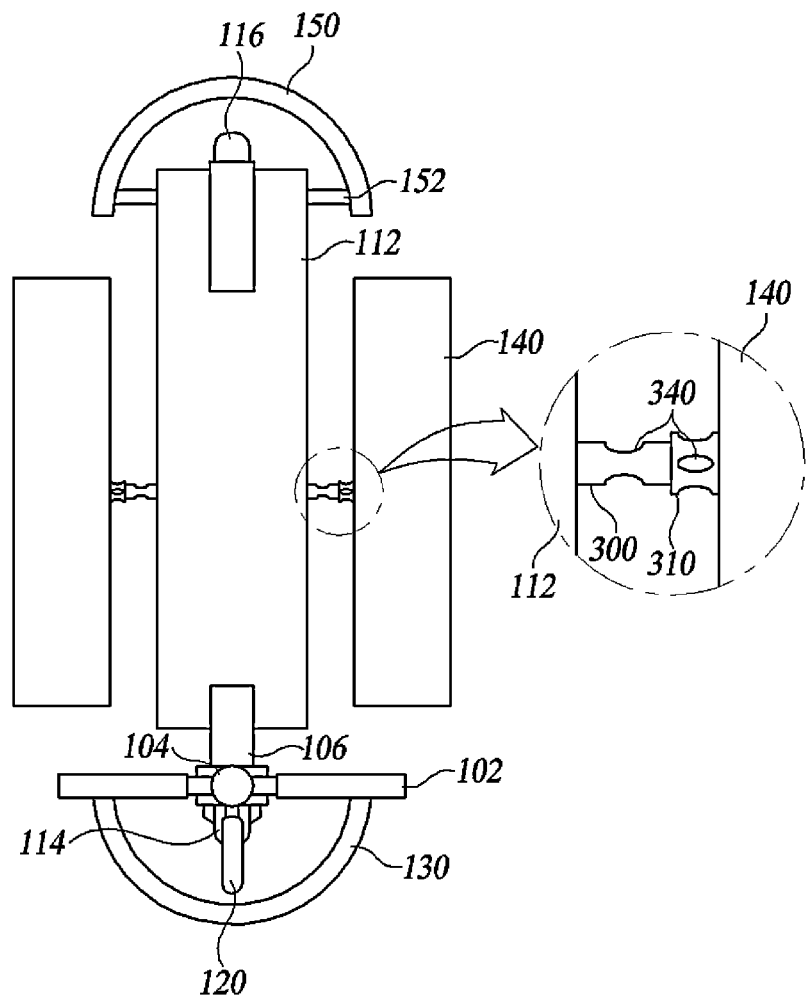

FIGS. 3A, 3B, and 3C are top views of a PMD equipped with guards in accordance with an embodiment of the present disclosure.

FIG. 3A shows the PMD including the grip 102, the steering axle 104, the fixation unit 106, the footboard 112, the front wheel 114, a rear wheel 116, the axle guard 120, the front guard 130, the side guards 140, the side guard connection units 142, the rear guard 150, and the rear guard connection unit 152.

The side guard connection units 142 in accordance with an embodiment of the present disclosure may be provided with a cushioning member or structure for cushioning. The cushioning member may be made of various materials that can absorb impact.

Referring to FIG. 3B, each side guard connection unit 142 may include a first frame 300, a second frame 310, a cushioning member 320, and a fixation unit 330.

The second frame 310 is disposed on one side of the first frame 300 and the footboard 112 is disposed on the other side. The first frame 300 is disposed on one side of the second frame 310 and the side guard 140 is disposed on the other side.

The interior between the first frame 300 and the second frame 310 is blocked.

The cushioning member 320 may be provided on a surface enclosed between the first frame 300 and the second frame 310.

The fixation unit 330 is provided in the second frame 310 and is disposed adjacent to the cushioning member 320. Here, the fixation unit 330 may be implemented as a rivet, a bolt, or the like.

When impact is applied to the side guard 140, the first frame 300 and the second frame 310 are under compressive force. The impact may be mitigated by the first frame 300, the cushioning member 320, and the fixation unit 330. Specifically, the first frame 300 and the fixation unit 330 are subjected to a force in the direction of the cushioning member 320 and the cushioning member 320 absorbs impact through tearing, breaking, or elasticity.

Meanwhile, referring to FIG. 3C, the side guard connection unit 142 is further illustrated with a plurality of apertures 340 for impact absorption.

When impact is applied to the side guard 140, the first frame 300 and the second frame 310 are under compressive force. The impact may be mitigated by the first frame 300 and the second frame 310, which include the plurality of apertures 340.

The first frame 300 and the second frame 310 may have increased deformation due to the plurality of apertures 340. The buckling and/or elasticity of the first frame 300 and the second frame 310 may mitigate impact on the footboard 112.

Figure 4:
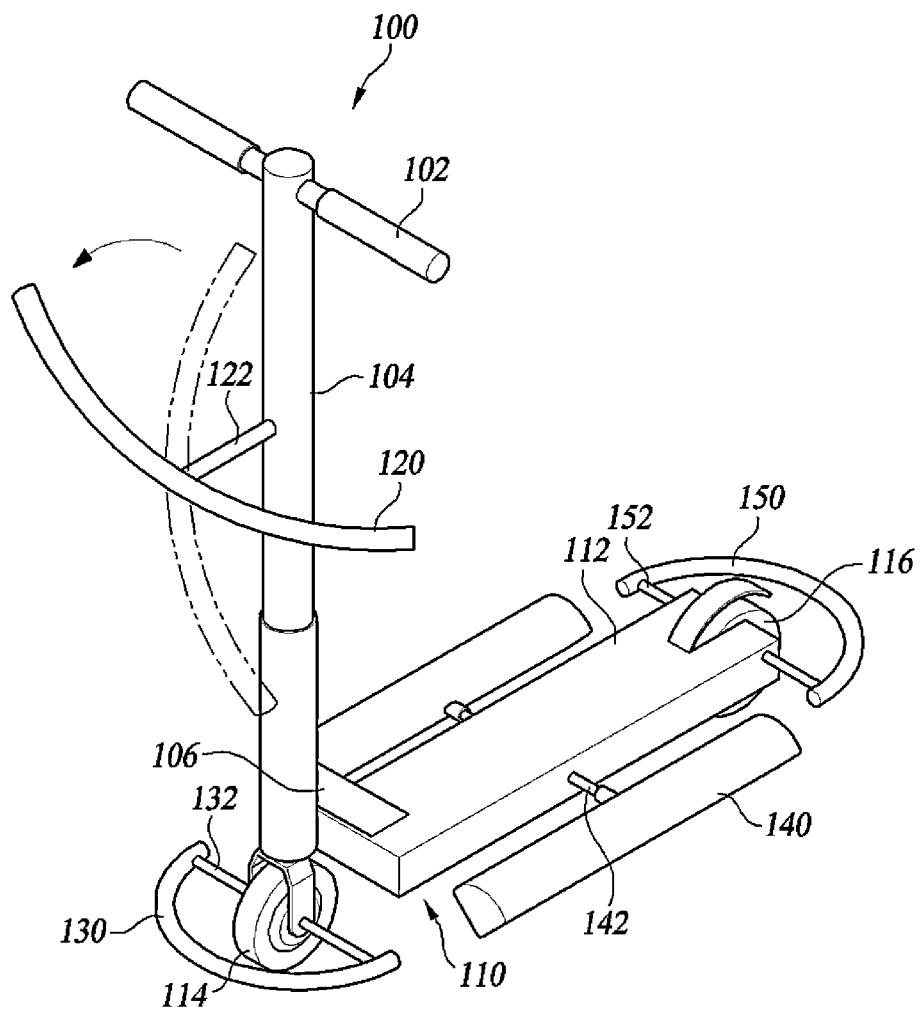
FIG. 4 is a perspective view for explaining rotation of an axle guard included as a guard in accordance with an embodiment of the present disclosure.

FIG. 4 is a perspective view for explaining rotation of an axle guard in accordance with an embodiment of the present disclosure.

FIG. 4 shows the PMD including the steering unit 100, the grip 102, the steering axle 104, the fixation unit 106, the footboard unit 110, the footboard 112, the front wheel 114, the rear wheel 116, the axle guard 120, the axle guard connection unit 122, the front guard 130, the front guard connection unit 132, the side guards 140, the side guard connection units 142, the rear guard 150, and the rear guard connection unit 152.

In accordance with an embodiment of the present disclosure, the axle guard 120 may be configured to be rotatable about a second rotation axis through the axle guard 120 and the steering axle 104. Here, the second rotation axis is a virtual axis perpendicular to the steering axle 104. The rotation may be performed manually or electronically.

In FIG. 4, the axle guard connection unit 122 connects the axle guard 120 and the steering axle 104. In other words, the axle guard 120 is disposed on one side of the axle guard connection unit 122 and the steering axle 104 is disposed on the other side. In this case, the axial direction of the axle guard connection unit 122 may be the second rotation axis.

The axle guard 120 is secured to and can rotate with the axle guard connection unit 122. Otherwise, axle guard connection unit 122 is secured to steering axle 104 and only the axle guard 120 can rotate.

The axle guard 120 is disposed parallel to the steering axle 104 to protect the PMD from external impact. Further, the axle guard 120 can mitigate external impact on passenger and can also mitigate impact on pedestrians.

When the axle guard 120 is disposed perpendicular to the steering axle 104, the grip 102 can be protected even if the PMD falls sideways. In order to protect the grip 102, the axle guard 120 must be longer than the grip 102.

FIGS. 5A, 5B, 5C, and 5D are diagrams of a PMD 500 equipped with guards in accordance with another embodiment of the present disclosure.

FIGS. 5A, 5B, 5C, and 5D show the PMD including a front guard 510, a front guard connection unit 512, side guards 520, side guard connection units 522, a rear guard 530, and a rear guard connection unit 532.

The PMD 500 in accordance with an embodiment of the present disclosure includes a frame unit, a steering unit, and a side guard 520. The basic structure of the PMD 500 is similar to the structure and skeleton of the PMD shown in FIG. 1A. However, there is a difference between the footboard and the body frame. Nevertheless, the features of the side guard 520, the front guard 510, the rear guard 530, and the axle guard are the same.

The frame unit includes a body frame (not shown), a front wheel disposed in front of the body frame, and a rear wheel disposed behind the front wheel in the body frame.

The body frame may be located within a body cover. The body frame may be divided into a main frame and a rear frame. Since the shape of the body frame should be apparent to those having ordinary skill in the art, a detailed description of the body frame has been omitted.

Furthermore, the body frame can be protected by the body cover. A user may place a foot on the footboard of the body cover.

The side guard 520 may be connected to the footboard or the body frame.

The steering unit includes a steering axle (not shown), a fixed unit (not illustrated) that connects the steering axle and the frame unit, and a grip disposed on one end of the steering axle.

The fixed unit is configured to connect the steering axle and the frame unit. The fixed unit may be configured to connect the front wheel to the body frame or steering axle. For example, the fixed unit may be a hinge.

The side guards 520 include a side guard disposed on both sides of the body frame and extending along the axial direction of the body frame.

The PMD 500 in accordance with an embodiment of the present disclosure may include some or all of the front guard 510, the side guard 520, and the rear guard 530 without an axle guard.

The front guard 510 is disposed adjacent to the front wheel and is configured to protect the front wheel. The rear guard 530 is disposed adjacent to the rear wheel and is configured to protect the rear wheel.

The front guard 510 is connected to the axle of the front wheel via a front guard connection unit 512. The rear guard 530 is connected to the axle of the rear wheel via a rear guard connection unit 532.

In accordance with an embodiment of the present disclosure, the cross section of the side guard 520, cut in a direction perpendicular to the axial direction of the body frame, has a fan shape with a curved region, wherein the curved region is configured to face upwards.

In accordance with the cross sectional shape of the side guards 520, when the PMD 500 is tilted, the contact area between the side guard 520 and the ground is widened (e.g., increased), so that the impact on the PMD 500 can be mitigated.

The cross section of the side guards 520 in accordance with another embodiment of the present disclosure may be implemented in any form that can enlarge the area in contact with the ground in case the PMD is tilted sideways.

In accordance with an embodiment of the present disclosure, the side guard 520 is curved along the axial direction of the body frame.

In accordance with one embodiment of the present disclosure, the PMD 500 further includes a side guard connection unit 522 that connects the body frame and each of the side guards 520.

Each side guard connection unit 522 is configured to be rotatable relative to the body frame about a first rotation axis, which is parallel to the axial direction of the body frame.

In accordance with an embodiment of the present disclosure, a cushioning member is provided inside each of the side guard connection units 522.

In accordance with an embodiment of the present disclosure, each side guard connection unit 522 includes a plurality of apertures for impact absorption.

Figure 5A:
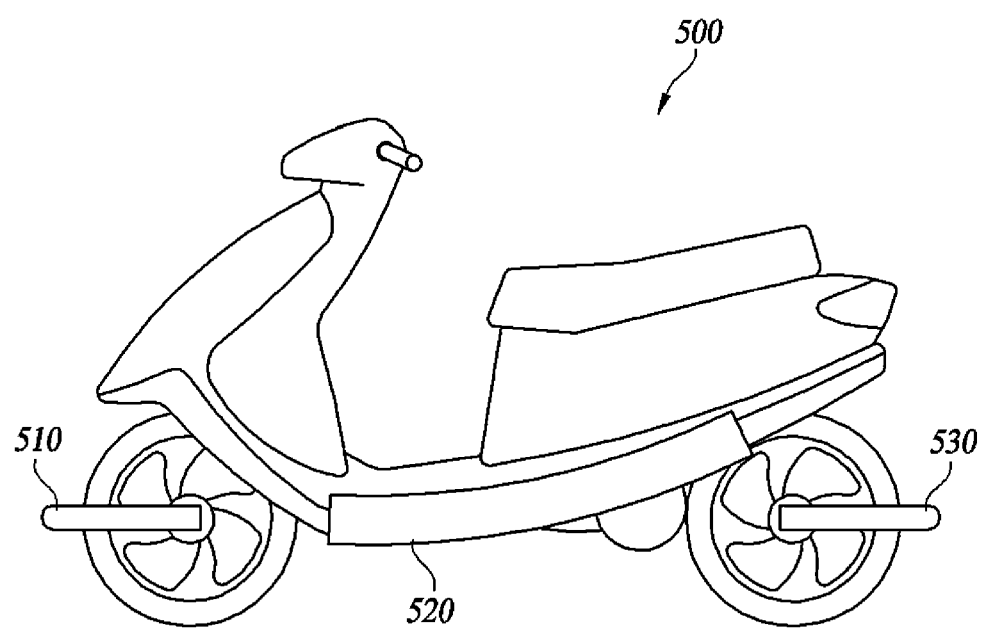
FIGS. 5A, 5B, 5C, and 5D are diagrams of a PMD equipped with guards in accordance with another embodiment of the present disclosure.
Figure 5B:
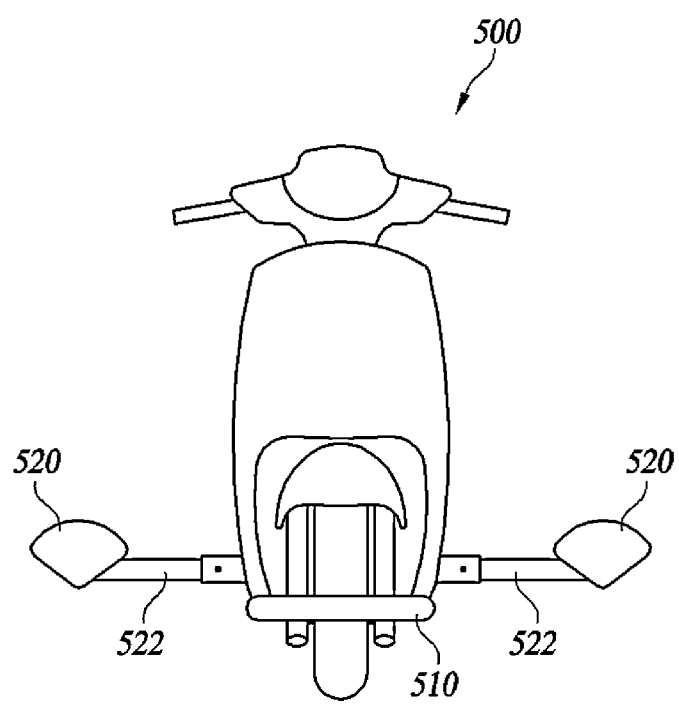
Figure 5C:
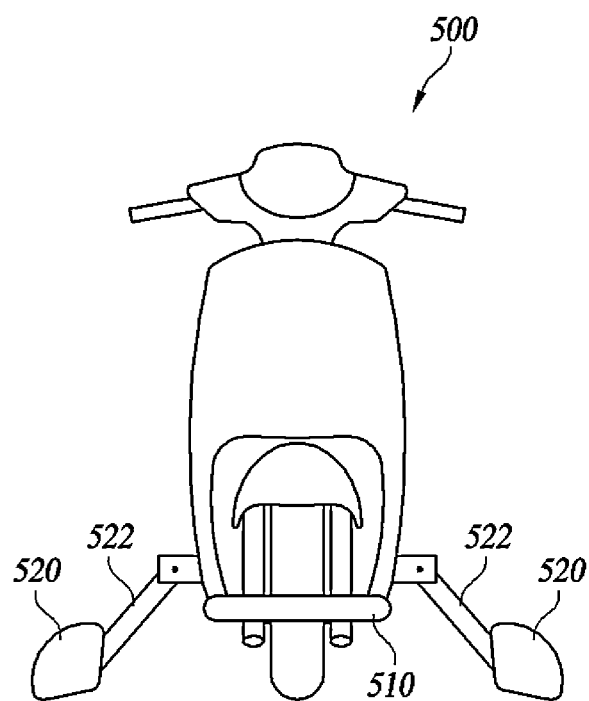
Figure 5D:
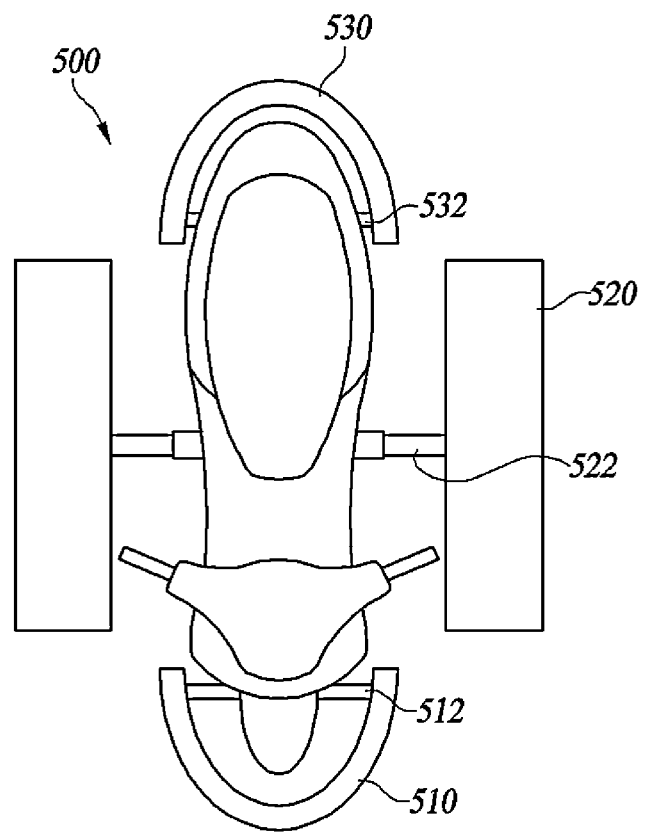

Referring to FIG. 5D, the side guard connection units 522 in accordance with an embodiment of the present disclosure may be provided with a cushioning member or a structure for cushioning. Here, the cushioning member may include one or more of a coil spring, a flat spring, a mini block spring, rubber material, sponge material, an elastic member, a damper, or the like. The damper may be implemented as a hydraulic system, a solid friction system, or a fluid friction system.

In accordance with an embodiment of the present disclosure, the side guard connection units 522 may be made of a softer material than the side guards 520 or the footboard. In addition, the cushioning members provided within the side guard connection units 142 may be implemented using a variety of materials or structures that can absorb impact. Through the cushioning member or structure of the side guard connection units 522, the PMD can be protected from external impact.

The side guard connection units 522 in accordance with an embodiment of the present disclosure includes a plurality of apertures for impact absorption. Due to the plurality of apertures, the side guard connection units 522 can easily be crushed when an impact is applied to one of the side guards 520. Otherwise, due to the plurality of apertures, the side guard connection units 522 may be resilient in various directions. The side guard connection units 522 may mitigate the impact exerted on the footboard by buckling or elasticity.

In accordance with an embodiment of the present disclosure, the PMD 500 may further include an axle guard disposed in front of the steering axle. The axle guard may extend along an axial direction of the steering axle.

The axle guard may be configured to be rotatable about a second rotation axis through the axle guard and the steering axle.

Although embodiments of the present disclosure have been described for illustrative purposes, those having ordinary skill in the art should appreciate that various modifications, additions, and substitutions are possible without departing from the idea and scope of the present disclosure. Therefore, embodiments of the present disclosure have been described for the sake of brevity and clarity. The scope of the technical idea of the present embodiments is not limited by the illustrations. For example, the PMD may include a side guard with a portion disposed on each side of the PMD or may include a separate side guard on each side of the PMD. Describing a side guard on each side of the PMD or on both sides of the PMD is intended to encompass both possibilities. Accordingly, those having ordinary skill in the art should understand the scope of the present disclosure should not be limited by the above explicitly described embodiments but by the claims and equivalents thereof.

As described above, according to the embodiment of the present disclosure, it is possible to protect occupants and pedestrians by protecting occupants from external impacts and reducing the impact of collisions with pedestrians.

As described above, according to another embodiment of the present disclosure, it is possible to protect a PMD from an impact applied to the PMD when the PMD collides with an external object or falls over.

As described above, according to another embodiment of the present disclosure, it is possible to protect occupants, pedestrians, and the PMD, as well as improve the drivability and usability of the PMD.

What is claimed is:

1. A personal mobility device (PMD) comprising:
    a footboard unit including a footboard, a front wheel disposed on the footboard, and a rear wheel disposed behind the front wheel on the footboard;
    a steering unit including a steering axle, a fixation unit that connects one end of the steering axle to the footboard unit, and a grip disposed on the other end of the steering axle;
    a side guard disposed on each side of the footboard unit and extended along an axial direction of the footboard; and
    an axle guard disposed in front of the handle axis and extended along the axial direction of the steering axle.

2. The PMD of claim 1, further comprising:
    a front guard disposed adjacent to the front wheel and configured to protect the front wheel; and
    a rear guard disposed adjacent to the rear wheel and configured to protect the rear wheel.

3. The PMD of claim 1, wherein a cross section of each side guard, if cut in a direction perpendicular to the axial direction of the footboard, has a fan shape that includes a curved area, and
    wherein the curved area of the fan shape is configured to face away from ground.

4. The PMD of claim 1, wherein the side guard is configured to be a curved shape along the axial direction of the footboard.

5. The PMD of claim 1, further comprising a side guard connection unit which connects the footboard and each side guard,
    wherein each side guard connection unit is configured to be rotatable relative to the footboard about a first rotation axis, which is parallel to the axial direction of the footboard.

6. The PMD of claim 1, further comprising a side guard connection unit, which connects the footboard and each side guard,
    wherein a cushioning member is provided inside each side guard connection unit.

7. The PMD of claim 1, further comprising a side guard connection unit, which connects the footboard and each side guard,
    wherein each side guard connection unit has a plurality of apertures for impact absorption.

8. The PMD of claim 1, wherein the axle guard is configured to be rotatable about a second rotation axis that passes through the axle guard and the steering axle.

* * * * *